June 8, 1937.  G. TURCO  2,082,991
DEVICE FOR CLEANSING AND STERILIZING COMBS
Original Filed May 31, 1935
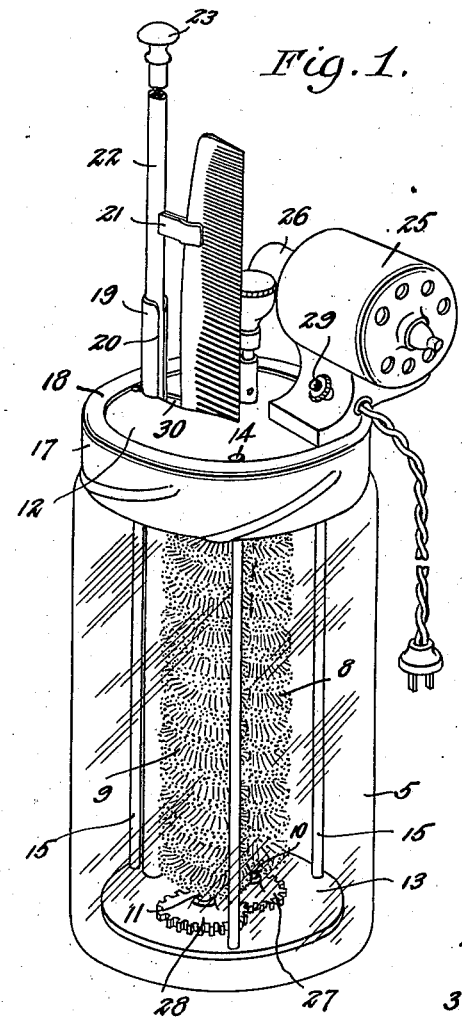
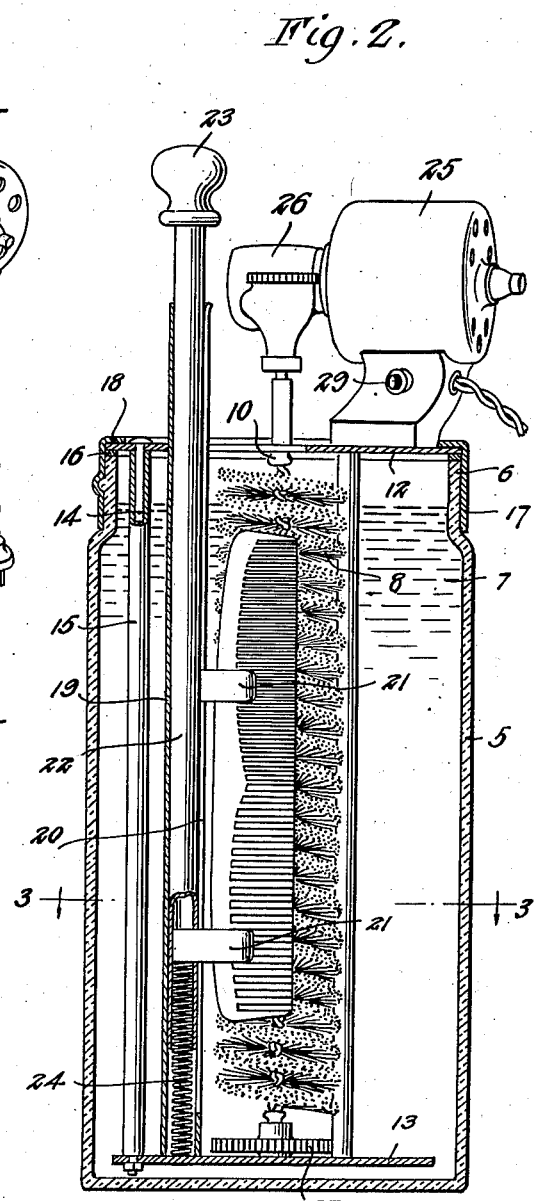
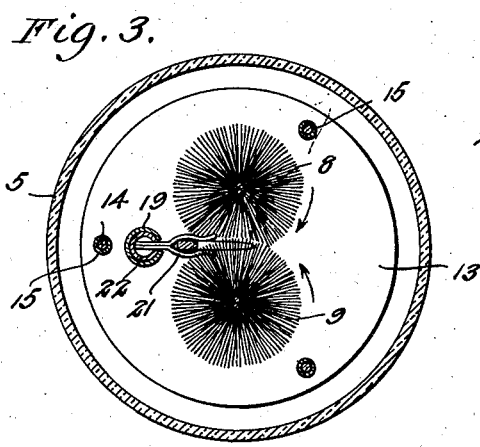
INVENTOR.
Generoso Turco
BY
Clark & Ott
ATTORNEYS Patented June 8, 1937

2,082,991

UNITED STATES PATENT OFFICE 2,082,991

DEVICE FOR CLEANSING AND STERILIZING COMBS

Generoso Turco, Brooklyn, N. Y.

Application May 31, 1935, Serial No. 24,168
Renewed January 5, 1937

4 Claims. (Cl. 15—39)

This invention relates generally to accessories especially designed for beauty parlors, barber shops or similar public establishments and refers more particularly to a device for cleansing and sterilizing combs.

The invention broadly comprehends in a device of the indicated character, a receptacle containing a cleansing and sterilizing liquid with a pair of driven rotary brushes submerged in the liquid and means for supporting a comb in juxtaposition to the brushes to be acted upon thereby, while submerged in the liquid, in order to simultaneously effect a rapid and thorough cleansing and sterilizing of the comb.

More specifically, the invention resides in a device of the character set forth and for the purpose specified, which includes a receptacle containing a cleansing and sterilizing liquid having a pair of intermeshing spiral brushes mounted for rotation on upright parallel axes with means for rotating the brushes in unison and a comb carriage with means for supporting and guiding the carriage from a position exterior of the receptacle to a position therein with the comb extending between and in contact with the peripheries of the brushes to be acted upon thereby while submerged in the cleansing and sterilizing liquid.

The invention further provides a device for cleansing and sterilizing combs which is comparatively simple in its construction and mode of use, which is economical to produce and operate and which is highly efficient for its intended purpose.

With the above enumerated and other objects in view, reference is made to the following specification and accompanying drawing in which there has been set forth, by way of example, the preferred embodiment of the invention, while the claims cover variations and modifications thereof which fall within the scope of the invention.

In the drawing:

Fig. 1 is a perspective view of the device illustrating a comb being moved to a position within the receptacle.

Fig. 2 is a vertical sectional view therethrough on an enlarged scale illustrating the comb in position for cleansing and sterilizing.

Fig. 3 is a horizontal sectional view taken approximately on the line 3—3 of Fig. 2.

Referring to the drawing by characters of reference, 5 designates a receptacle in the form of a jar and preferably made of glass or an equivalent transparent material which is closed at its lower end and provided with an open neck 6 at its upper end. The receptacle 5 is adapted to contain a suitable comb cleansing and sterilizing liquid 7.

The device includes a pair of brushes 8 and 9 mounted for rotation on parallel axes within the receptacle and submerged within the liquid. The brushes are preferably, as shown, of the spiral or helical type with their convolutions intermeshing so that the peripheries of the convolutions of one brush overlap the peripheries of the convolutions of the other brush. The shafts 10 and 11 of the brushes are journaled for rotation in vertically spaced upper and lower plates 12 and 13 which are connected together and spaced apart by circumferentially spaced rods 14 and spacing sleeves 15. The upper plate 12 is of a diameter to be supported upon the upper end of the neck 6 of the receptacle 5 and between the underside of the plate 12 and the upper edge of the neck a gasket 16 is interposed. A sleeve 17 is threadedly engaged over the neck 6 and is provided with an inwardly directed annular flange 18 for removably clamping the plate 12 in place, thereby providing a cover for the upper end of the receptacle. The tubular guide 19 is secured at its lower end to the plate 13 and extends upwardly therefrom through the upper plate 12. The tubular guide 19 is provided with a longitudinally extending slot 20 which opens through its upper end and is adapted to receive therethrough vertically spaced resilient comb supporting clips 21 which are secured to and project radially from a comb carriage 22 which is slidable in the guide 19. The carriage 22 is preferably in the form of a tube extending upwardly through and protruding through the upper end of the guide with a manipulating handle 23 at its upper end. A coiled expansion spring 24 is seated at its lower end on the platform 13 and extends upwardly into the lower end of the tubular carriage 22 where its upper end is engaged with the lowermost clip 21 for normally exerting a tension to effect the upward movement of the comb carriage in the tubular guide 19. The guide 19 and carriage 22, together with the comb clips 21, dispose a comb supported thereby in a position extending between and in contact with the peripheries of the brushes 8 and 9 whereby, when the brushes are rotated, the bristles thoroughly and completely cleanse the comb by direct action over the surface of the same and between the teeth thereof, while the liquid 7 assists in the cleansing and sterilizes the comb simultaneously with the cleansing operation.

The brushes are driven in unison by a motor 25 which is preferably secured to and mounted upon the upper plate 12 and is connected through a reducing gear in a gear box 26 with the shaft 10 of the brush 8. Motion is transmitted from the shaft 10 of the brush 8 to the shaft 11 of the brush 9 by intermeshing gears 27 and 28 and the brushes are preferably driven in the direction indicated by the arrows in Fig. 3. A suitable switch controlled by a push button 29 renders the motor 25 active and inactive. The upper plate 12 is formed with a comb slot 30 which extends outwardly from the slot 20 of the guide 19 whereby the comb is introduced to and removed from the receptacle 5.

In operation, with the carriage 22 elevated, the comb is engaged with the clips 21 and the handle 23 is depressed against the action of the spring 24 to move the comb through the comb slot where it is located in the position shown in Figs. 2 and 3 to be acted upon by the brushes, while submerged in the cleansing and sterilizing liquid 7. In a very short period of time the comb will be freed of all foreign matter while the liquid simultaneously acts to sterilize the same. The carriage 22 and guide 19 will be so constructed that when the comb is in its lowered active position for cleansing, frictional interengagement between the carriage and guide will retain the comb in this position against the action of the spring until the carriage is slightly elevated when the spring will serve to raise the carriage to a position which fully exposes the comb for removal.

What is claimed is:

1. A cleansing and sterilizing device for combs including a receptacle adapted to contain a cleansing and sterilizing liquid, a pair of spiral brushes mounted for rotation on upright parallel axes and arranged with the convolutions of one brush extending between the convolutions of the other, means for rotating the brushes in unison, a cover for said receptacle having a comb receiving slot, a comb carriage and means for supporting and guiding said carriage from a position above the cover and exterior of the receptacle to a position within the receptacle with the comb disposed tangential to and between the brushes.

2. A cleansing and sterilizing device for combs, including a receptacle adapted to contain a cleansing and sterilizing liquid, a pair of spiral brushes mounted for rotation on upright axes, means for rotating the brushes in unison, a cover for said receptacle having a comb receiving slot, a comb carriage and means for supporting and guiding said carriage from a position above the cover and exterior of the receptacle to a position within the receptacle with the comb disposed in contact with the brushes.

3. A cleansing and sterilizing device for combs including a receptacle adapted to contain a cleansing and sterilizing liquid, a removable cover plate having a comb receiving slot, a bottom plate connected to and spaced from the cover plate, a pair of driven rotary brushes journaled in said plates and submerged in the liquid, and means for supporting and guiding said comb through the comb slot from a position exterior of the receptacle to a position submerged in the liquid and disposed in contact with the brushes, said comb supporting and guiding means including a longitudinal slotted tubular guide having its upper end disposed in registration with the comb receiving slot and extending downwardly from the cover plate to the bottom plate, and a member longitudinally slidable in said guide and having radially projecting comb clips extending through the slot of said guide.

4. A cleansing and sterilizing device for combs including a receptacle adapted to contain a cleansing and sterilizing liquid, a removable cover plate having a comb receiving slot, a bottom plate connected to and spaced from the cover plate, a pair of driven rotary brushes journaled in said plates and submerged in the liquid, and means for supporting and guiding said comb through the comb slot from a position exterior of the receptacle to a position submerged in the liquid and disposed in contact with the brushes, said comb supporting and guiding means including a longitudinal slotted tubular guide having its upper end disposed in registration with the comb receiving slot and extending downwardly from the cover plate to the bottom plate, a member longitudinally slidable in said guide and having radially projecting comb clips extending through the slot of said guide, and means for normally elevating said member to dispose the comb clips exterior of the receptacle.

GENEROSO TURCO.